(12) United States Patent
Atkinson et al.

(10) Patent No.: US 7,643,408 B2
(45) Date of Patent: Jan. 5, 2010

(54) RESTORATION TIME IN NETWORKS

(75) Inventors: Gary W. Atkinson, Freehold, NJ (US);
Michael L. Craner, Exton, PA (US);
Ramesh Nagarajan, Somerset, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 766 days.

(21) Appl. No.: 10/815,123

(22) Filed: Mar. 31, 2004

(65) Prior Publication Data

US 2004/0205236 A1 Oct. 14, 2004

Related U.S. Application Data

(60) Provisional application No. 60/459,163, filed on Mar. 31, 2003.

(51) Int. Cl.
*H04L 1/22* (2006.01)
(52) U.S. Cl. .................. 370/217; 370/238; 398/2
(58) Field of Classification Search .......... 370/406, 370/225, 244, 216–228, 238, 238.1, 239; 709/239, 241; 398/1–8, 58, 50, 54; 714/4, 714/43
See application file for complete search history.

(56) References Cited

U.S. PATENT DOCUMENTS

| 4,190,821 A | 2/1980 | Woodward | 714/4 |
|---|---|---|---|
| 4,594,709 A | 6/1986 | Yasue | 714/4 |
| 4,797,882 A | 1/1989 | Maxemchuk | 370/94 |
| 5,365,518 A | 11/1994 | Noser | 370/535 |
| 5,452,286 A | 9/1995 | Kitayama | 370/228 |
| 5,506,956 A | 4/1996 | Cohen | 395/182.04 |
| 5,706,276 A * | 1/1998 | Arslan et al. | 370/216 |
| 5,754,543 A | 5/1998 | Seid | 370/351 |
| 5,854,903 A | 12/1998 | Morrison et al. | 395/200.79 |
| 5,856,981 A | 1/1999 | Voelker | 371/20.1 |
| 5,881,048 A | 3/1999 | Croslin | 370/228 |
| 5,933,422 A | 8/1999 | Kusano et al. | 370/331 |
| 5,933,425 A | 8/1999 | Iwata | 370/351 |
| 5,956,339 A | 9/1999 | Harada et al. | 370/400 |
| 5,995,485 A | 11/1999 | Croslin | 370/216 |
| 6,075,766 A | 6/2000 | Croslin | 370/225 |
| 6,097,696 A | 8/2000 | Doverspike | 370/216 |
| 6,104,701 A | 8/2000 | Avargues et al. | 370/238 |

(Continued)

OTHER PUBLICATIONS

B. T. Doshi et al, "Optical Network Design and Restoration", Bell Labs Technical Journal, 1999, pp. 58-84.*

(Continued)

*Primary Examiner*—Aung S Moe
*Assistant Examiner*—Habte Mered
(74) *Attorney, Agent, or Firm*—Mendelsohn, Drucker & Associates, P.C.; Steve Mendelsohn

(57) ABSTRACT

A restoration path planner minimizes cost while meeting restoration-time constraints of a network by reducing the worst-case number of cross-connections that must be performed in a network in the event of a single element failure. The planner involves optimization that identifies primary and restoration path plans for demands within the network such that the worst-case number of cross-connections at any node within the network is minimal and/or bounded. Embodiments further constrain the cost of the path plan. In one embodiment, restoration time is bounded and cost is relaxed until a solution is found. In another embodiment, the restoration time bound is relaxed to a limit while path plans and their costs are stored. These plans can later be chosen amongst for the desired balance of cost and restoration time. At least one approach to minimization of network cost involves maximizing sharing within restoration path plans.

20 Claims, 2 Drawing Sheets

U.S. PATENT DOCUMENTS

| | | | | |
|---|---|---|---|---|
| 6,130,875 A * | 10/2000 | Doshi et al. | | 370/225 |
| 6,141,319 A | 10/2000 | Dighe et al. | | 370/218 |
| 6,205,117 B1 * | 3/2001 | Doshi et al. | | 370/228 |
| 6,282,170 B1 | 8/2001 | Bentall et al. | | 370/225 |
| 6,477,582 B1 | 11/2002 | Luo et al. | | 709/241 |
| 6,512,740 B1 | 1/2003 | Baniewicz et al. | | 370/216 |
| 6,538,987 B1 | 3/2003 | Cedrone et al. | | 370/216 |
| 6,549,513 B1 | 4/2003 | Chao et al. | | 370/227 |
| 6,606,303 B1 | 8/2003 | Hassel et al. | | 370/220 |
| 6,643,464 B1 | 11/2003 | Roorda et al. | | 398/59 |
| 6,697,334 B1 | 2/2004 | Klincewicz et al. | | 370/238 |
| 6,711,125 B1 | 3/2004 | Walrand et al. | | 370/223 |
| 6,725,401 B1 | 4/2004 | Lindhorst-Ko | | 714/47 |
| 6,744,727 B2 | 6/2004 | Liu et al. | | 370/228 |
| 6,760,302 B1 | 7/2004 | Ellinas et al. | | 370/228 |
| 6,778,492 B2 | 8/2004 | Charny et al. | | 370/228 |
| 6,795,394 B1 | 9/2004 | Swinkels et al. | | 370/222 |
| 6,807,653 B2 | 10/2004 | Saito | | 716/2 |
| 6,842,723 B2 | 1/2005 | Alicherry et al. | | 703/2 |
| 6,850,487 B2 | 2/2005 | Mukherjee et al. | | 370/225 |
| 6,856,592 B2 | 2/2005 | Grover et al. | | 370/216 |
| 6,863,363 B2 | 3/2005 | Yabuta | | 347/19 |
| 6,882,627 B2 | 4/2005 | Pieda et al. | | 370/248 |
| 6,895,441 B1 | 5/2005 | Shabtay et al. | | 709/238 |
| 6,904,462 B1 | 6/2005 | Sinha | | 709/226 |
| 6,977,889 B1 | 12/2005 | Kawaguchi et al. | | 370/228 |
| 6,982,951 B2 | 1/2006 | Doverspike et al. | | 370/217 |
| 6,990,068 B1 | 1/2006 | Saleh et al. | | 370/225 |
| 6,996,065 B2 | 2/2006 | Kodialam et al. | | 370/238 |
| 7,009,991 B2 | 3/2006 | Shachar et al. | | 370/436 |
| 7,039,009 B2 | 5/2006 | Chaudhuri et al. | | 370/225 |
| 7,042,836 B2 | 5/2006 | Isonuma et al. | | 370/224 |
| 7,099,286 B1 | 8/2006 | Swallow | | 370/255 |
| 7,110,356 B2 | 9/2006 | Illikkal et al. | | 370/222 |
| 7,133,358 B2 | 11/2006 | Kano | | 370/221 |
| 7,164,652 B2 | 1/2007 | Puppa et al. | | 370/225 |
| 7,180,852 B1 | 2/2007 | Doverspike et al. | | 370/217 |
| 7,188,280 B2 * | 3/2007 | Shinomiya et al. | | 714/43 |
| 7,197,008 B1 | 3/2007 | Shabtay et al. | | 370/218 |
| 7,209,975 B1 | 4/2007 | Zang et al. | | 709/238 |
| 7,218,851 B1 | 5/2007 | Zang | | 398/33 |
| 7,248,561 B2 | 7/2007 | Ishibashi et al. | | 370/228 |
| 7,272,116 B1 | 9/2007 | Houchen | | 370/258 |
| 7,274,869 B1 | 9/2007 | Pan | | 398/5 |
| 7,280,755 B2 * | 10/2007 | Kang et al. | | 398/7 |
| 7,286,489 B2 | 10/2007 | Ades | | 370/254 |
| 7,301,895 B2 | 11/2007 | Saleh et al. | | 370/218 |
| 7,308,198 B1 * | 12/2007 | Chudak et al. | | 398/58 |
| 7,342,873 B1 | 3/2008 | Nagarajan | | 370/217 |
| 7,352,692 B1 | 4/2008 | Saleh et al. | | 370/216 |
| 7,362,709 B1 | 4/2008 | Hui et al. | | 370/237 |
| 7,398,321 B2 | 7/2008 | Qiao et al. | | 709/239 |
| 7,430,164 B2 | 9/2008 | Bare | | 370/217 |
| 7,477,657 B1 | 1/2009 | Murphy et al. | | 370/468 |
| 7,502,313 B2 | 3/2009 | Saleh et al. | | 370/216 |
| 2001/0038471 A1 | 11/2001 | Agrawal et al. | | 359/110 |
| 2001/0048660 A1 | 12/2001 | Saleh et al. | | 370/216 |
| 2002/0004843 A1 | 1/2002 | Andersson et al. | | 709/238 |
| 2002/0009092 A1 | 1/2002 | Seaman et al. | | 370/406 |
| 2002/0059432 A1 | 5/2002 | Masuda et al. | | 709/227 |
| 2002/0067693 A1 | 6/2002 | Kodialam et al. | | 370/216 |
| 2002/0071392 A1 | 6/2002 | Grover et al. | | 370/241 |
| 2002/0097671 A1 | 7/2002 | Doverspike et al. | | 370/216 |
| 2002/0118636 A1 | 8/2002 | Phelps et al. | | 370/222 |
| 2002/0141334 A1 | 10/2002 | Deboer et al. | | 370/227 |
| 2002/0174207 A1 | 11/2002 | Battou | | 709/223 |
| 2002/0181444 A1 | 12/2002 | Acampora | | 370/352 |
| 2002/0191247 A1 | 12/2002 | Lu et al. | | 359/124 |
| 2002/0194339 A1 | 12/2002 | Lin et al. | | 709/226 |
| 2003/0005165 A1 | 1/2003 | Langridge et al. | | 709/251 |
| 2003/0009582 A1 | 1/2003 | Qiao et al. | | 709/233 |
| 2003/0016624 A1 | 1/2003 | Bare | | 370/217 |
| 2003/0018812 A1 * | 1/2003 | Lakshminarayana et al. | | 709/241 |
| 2003/0021222 A1 | 1/2003 | Boer et al. | | 370/216 |
| 2003/0037276 A1 | 2/2003 | Mo et al. | | 714/4 |
| 2003/0048749 A1 | 3/2003 | Stamatelakis et al. | | 370/225 |
| 2003/0065811 A1 | 4/2003 | Lin et al. | | 709/232 |
| 2003/0095500 A1 | 5/2003 | Cao | | 370/216 |
| 2003/0112760 A1 | 6/2003 | Puppa et al. | | 370/241.1 |
| 2003/0117950 A1 | 6/2003 | Huang | | 370/220 |
| 2003/0147352 A1 | 8/2003 | Ishibashi et al. | | 370/248 |
| 2003/0169692 A1 | 9/2003 | Stern et al. | | 370/242 |
| 2003/0179700 A1 | 9/2003 | Saleh et al. | | 370/216 |
| 2003/0179701 A1 | 9/2003 | Saleh et al. | | 370/216 |
| 2003/0193944 A1 | 10/2003 | Sasagawa | | 370/389 |
| 2003/0223357 A1 | 12/2003 | Lee | | 370/218 |
| 2004/0004938 A1 | 1/2004 | Buddhikot et al. | | 370/238 |
| 2004/0008619 A1 | 1/2004 | Doshi et al. | | 370/217 |
| 2004/0032831 A1 | 2/2004 | Matthews | | 370/238 |
| 2004/0042402 A1 | 3/2004 | Galand et al. | | 370/237 |
| 2004/0052207 A1 | 3/2004 | Charny et al. | | 370/216 |
| 2004/0057375 A1 | 3/2004 | Shiragaki et al. | | 370/216 |
| 2004/0114512 A1 | 6/2004 | Johri | | 370/225 |
| 2004/0165526 A1 | 8/2004 | Yada et al. | | 370/228 |
| 2004/0174882 A1 | 9/2004 | Willis | | 370/395.5 |
| 2004/0184402 A1 | 9/2004 | Alicherry et al. | | 370/216 |
| 2004/0186696 A1 | 9/2004 | Alicherry et al. | | 703/1 |
| 2004/0190441 A1 | 9/2004 | Alfakih et al. | | 370/216 |
| 2004/0190445 A1 | 9/2004 | Dziong et al. | | 370/225 |
| 2004/0190461 A1 | 9/2004 | Gullicksen et al. | | 370/258 |
| 2004/0205239 A1 | 10/2004 | Doshi et al. | | 709/241 |
| 2004/0208547 A1 | 10/2004 | Sabat et al. | | 398/50 |
| 2004/0233843 A1 | 11/2004 | Barker | | 370/225 |
| 2005/0036442 A1 | 2/2005 | Saleh et al. | | 370/216 |
| 2005/0185652 A1 | 8/2005 | Iwamoto | | 370/395.1 |
| 2005/0201276 A1 | 9/2005 | Sinha | | 370/225 |
| 2005/0232144 A1 | 10/2005 | Doverspike et al. | | 370/216 |
| 2006/0013149 A1 | 1/2006 | Jahn et al. | | 370/254 |
| 2006/0051090 A1 | 3/2006 | Saniee et al. | | 398/59 |
| 2006/0153066 A1 | 7/2006 | Saleh et al. | | 370/216 |
| 2006/0178918 A1 | 8/2006 | Mikurak | | 705/7 |
| 2007/0011284 A1 | 1/2007 | Le Roux et al. | | 709/223 |
| 2007/0104120 A1 | 5/2007 | Shah-Heydari | | 370/256 |
| 2007/0189191 A1 | 8/2007 | Ades | | 370/254 |
| 2008/0095045 A1 | 4/2008 | Owens et al. | | 370/220 |
| 2008/0225696 A1 | 9/2008 | Saleh et al. | | 370/216 |
| 2008/0310299 A1 | 12/2008 | Saleh et al. | | 370/221 |
| 2009/0040989 A1 | 2/2009 | da Costa et al. | | 370/338 |

OTHER PUBLICATIONS

Gary P. Austin, Bharat T. Doshi, Christopher J. Hunt, Ramesh Nagarajan, and M.Akber Qureshi, "Fast, Scalabale, and Distributed Restoration in General Mesh Optical Networks", Bell Labs Technical Journal, Jan.-Jun. 2007.*

Yasuhiro Miyao and Hiroyuki Saito, "Optimal Design and Evaluation of Survivable WDM Transport Networks", IEEE, 1998.*

"Using Local Information for WDM Network Protection", by Hungjen Wang et al., http://www.mit.edu/~modiano/papers/C46.pdf, 2002, pp. 1-4.

"Operation & Maintenance mechanism for MPLS networks," ITU-T Recommendation Y.1711; Telecommunication Standardization Sector of ITU; Series Y: Global Information Infrastructure And Internet Protocol Aspects; Nov. 2002.

"Design of a Meta-mesh of Chain Subnetworks: Enhancing the Attractiveness of Mesh-Restorable WDM networking on Low Connectivity Graphs" by W.D. Grover and J. Doucette, IEEE JSAC, vol. 20, No. 1, Jan. 2002.

"RSVP-TE: Extensions to RSVP for LSP Tunnels" by D. Awduche, L. Berger, D. Gan, T. Li, V. Srinivasan, and G. Swallow; Cisco Systems, Inc. Dec. 2001, pp. 1-55.

"Optical Network Design and Restoration" by B.T. Doshi, et al., BLTJ, Jan.-Mar. 1999.

"SONET Bidirectional Line-Switched Ring Equipment Generic Criteria" Generic Requirements, GR1230-CORE, Issue 4, Dec. 1998, pp. 3-48 through 3-61.

"Cisco's Packet over SONET/SDH (POS) Technology Support; Mission Accompished" Copyright 1997. Cisco Systems, Inc. pp. 1-8.

"Availability Analysis of Span-Restorable Mesh Networks," M. Clouqueur, WD Grover - IEEE Journal on Selected Areas in Communications, 2002, pp. 1-30.

"Quantifying and Managing the Influence of Maintenance Actions on the Survivability of Mesh-Restorable Networks" WD Grover, M. Clouqueur, T. Bach - Proceedings of National Fiber Optic Engineers, 2001, pp. 1-12.

"Design of a Meta-Mesh of Chain Subnetworks: Enhancing the Attractiveness of Mesh-Restorable WDM Networking on Low Connectivity Graphs," Grover, W.D. Doucette, J. TRLabs, Edmonton, Alta.; This paper appears in: Selected Areas in Communications, IEEE Journal on Publication Date: Jan. 2002, vol. 20, Issue: 1, pp. 47-61.

"Availability Analysis of Span-Restorable Mesh Networks," Clouqueur, M., Grover, W.D.; Selected Areas in Communications, IEEE Journal on vol. 20, Issue 4, May 2002, pp. 810-821.

* cited by examiner

RESTORATION TIME IN NETWORKS

CROSS-REFERENCE TO RELATED APPLICATIONS

This application claims the benefit of the filing date of U.S. provisional application No. 60/459,163, filed on Mar. 31, 2003, incorporated herein by reference in its entirety. The subject matter of this application is related to U.S. patent application Ser. No. 10/673,383 filed on Sep. 26, 2003, incorporated herein by reference in its entirety (herein "Doshi '03") and U.S. patent application Ser. No. 10/673,056 filed on Sep. 26, 2003, also incorporated herein by reference in its entirety (herein "Alfakih '03")

BACKGROUND OF THE INVENTION

1. Field of the Invention

The present invention relates to optical networks and, more specifically, to cost reduction and restoration time improvement in mesh optical networks.

2. Description of the Related Art

Reliability and cost are two parameters that drive the design of modern day networks. To support high reliability, it is typical to provide path redundancy for services. To control costs, it is common to attempt to maximize the utilization of available resources and generate redundant paths in consideration of multiple-cost criteria.

Generally, reliability is supported by providing both a primary path and a restoration path for each service in the network. In the event of a failure along the primary path for a service, the service is switched over to the associated restoration path. For optical mesh networks, one challenge is to support restoration times that are comparable to those provided by SONET/SDH networks with self-healing rings (e.g., 10-100 ms restoration times). To help reduce network restoration time in optical mesh networks, a number of approaches have been considered, including improving restoration signaling and associated algorithms, and improving the switching speed of cross-connection infrastructure switching elements.

SUMMARY OF THE INVENTION

One factor that determines a lower bound on restoration time is the maximum number of cross-connections to be performed at a single network element in the event of a failure. Assuming everything else is constant, the larger the number of cross-connections, the longer the restoration time. Thus, path planning can be performed which minimizes restoration time by carefully selecting primary and restoration paths for demands within a network such that the worst-case number of cross-connections is minimized across all possible single-event failures in the network.

On the other hand, the choice of primary and restoration paths for demands in a network can also affect the cost of a network where the magnitude of the effect on cost can be different depending on the cost metric that is considered (e.g., administrative weight, bandwidth, distance cost, and/or the degree to which restoration bandwidth between multiple disjoint primary paths can be shared).

Problems in the prior art are addressed in accordance with principles of the present invention by a method and apparatus for restoration-path planning that minimizes network cost while meeting an upper bound on restoration time associated with single-event failures in a mesh network.

In certain embodiments, network-cost minimization is a function of maximizing the utilization of network resources and can include the maximization of sharing of network resources (e.g., restoration bandwidth), while restoration time is bounded by application of an optimization that reduces the worst-case number of cross-connections that must be performed in a network in the event of a single element (e.g., node or link) failure.

One optimization involves two phases. The first phase of the optimization involves finding two node-disjoint paths for each service demand within a network such that the maximum link bandwidth in the network is minimized and the link bandwidths within the network are substantially leveled. The second phase involves identifying the primary and restoration paths for each service demand within the network such that the worst-case number of cross-connections at any node within the network is minimized across all possible single-event failures.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Cost and Restoration Time

Network designers typically are faced with more than one constraint in the process of network design. Although it may be important to a service provider to find a network path plan that meets the restoration-time goals of a client, it is also important, from a competitive perspective, for the service provider to do so with minimum cost. To this end, one embodiment of the present invention combines restoration-time-minimization techniques such as those discussed in Alfakih '03 with resource-sharing-maximization techniques such as those discussed in Doshi '03. As can be appreciated by one skilled in the art, there are a number of different ways to implement a solution to this problem. In the following, two exemplary procedures are discussed.

Cost Relaxation with Fixed Restoration-Time Bound

Figure 1:
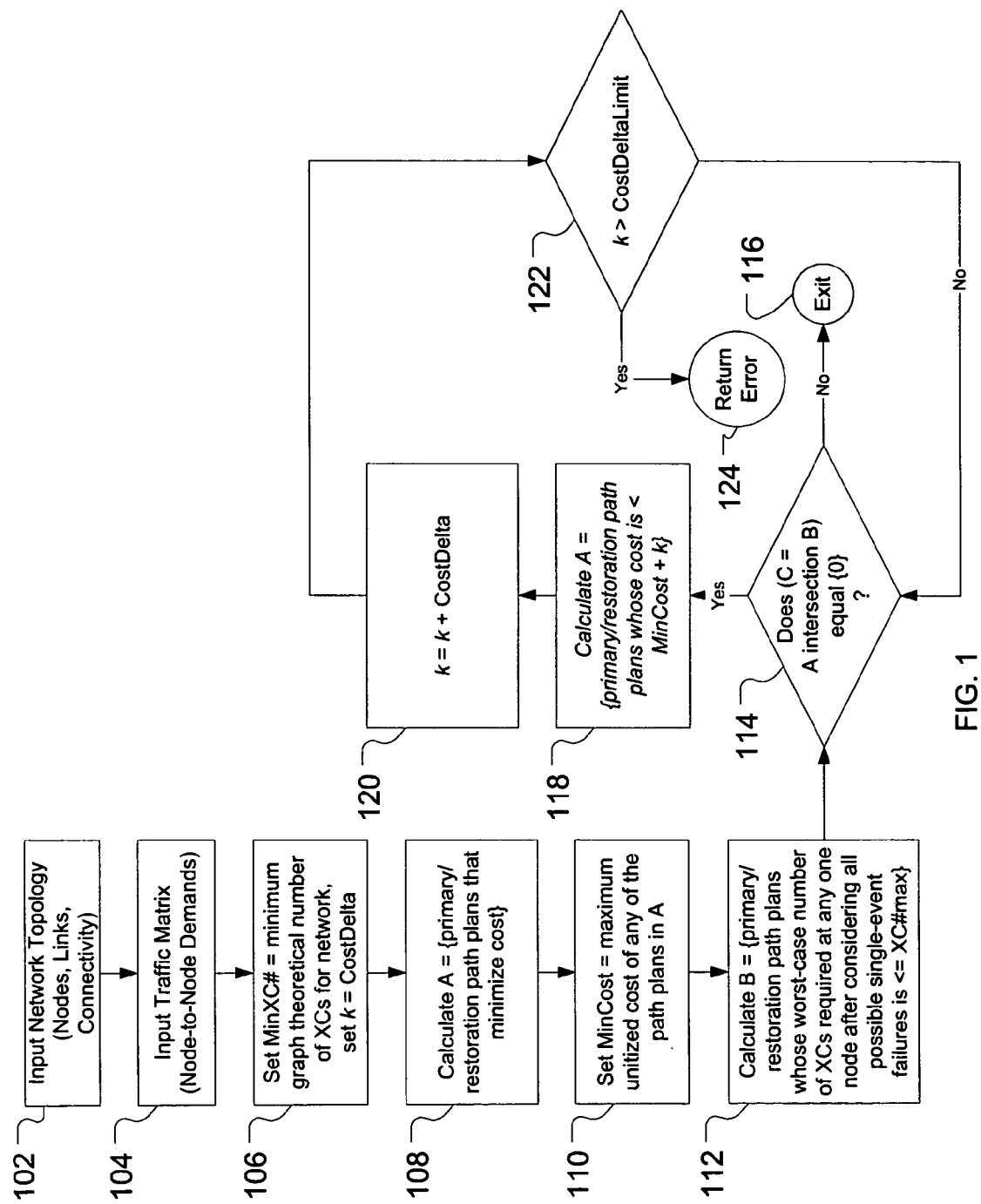
FIG. 1 illustrates a method for minimizing cost within a network while meeting restoration-time requirements via the minimization of cross-connections within the network according to one embodiment of the present invention.

One embodiment of the present invention is illustrated by the procedure of FIG. 1. As shown in steps 102 and 104, the network topology and traffic demands, respectively, for the network are input. In step 106, the variable MinXC# is set to the graph-theoretical minimum number of cross-connections (XCs) for the network topology and traffic demands that were input in steps 102 and 104. Also, in step 106, the variable k is initialized to CostDelta, a value (e.g., one) that represents the cost relaxation step size that will be used by the procedure. In step 108, set A is set equal to the set of the primary/restoration path plans for the network that minimize cost (e.g., maximizes sharing per Doshi '03).

Next, in step 110, the variable MinCost is set equal to the maximum cost of any of the path plans in set A. The "cost" can be a bandwidth cost, administrative cost, distance cost, or a combination of one or more of those or other cost metrics that are important to the network planner, other than restoration time, which is considered separately in this implementation.

In step 112, set B is set equal to the set of primary/restoration path plans for the network whose worst-case number of XCs required at any one node after considering all possible single-event failures is less than or equal to XC#max, where XC#max is a bound on the maximum number of cross-connections that can be tolerated in the network according to some quality-of-service agreement between the service provider and the client. So, for example, if the service agreement is a bound of 300 ms, and the time for a single cross-connection is 10 ms, XC#max would be 30. XC#max, in actual implementations, may be a function of a number of different variables including traffic, message bundle sizes, signaling bandwidth, signaling processor speed, and message buffers sizes, as would be understood to one skilled in the art. XC#max is always greater than or equal to MinXC# and is sometimes initialized to be some predefined offset from MinXC#, for example XC#max=MinXC#+XC#delta.

Next, in the test of step 114, set C is assigned to be the intersection of sets A and B and this intersection is compared with the null set {0}. If C is not equal to the null set, then this means that each of the path plans in C has a maximum number of cross-connections that is within the service agreements of the network operator and also has minimum cost. In this case, the method terminates at step 116 with a set C of one or more path plans that meet the restoration time goals of the service provider at minimal cost.

If the intersection of the two sets in step 114 is null, then, in step 118, set A is set equal to the set of all primary/restoration path plans whose cost is less than (MinCost+k). In other words, the cost constraint is relaxed by one unit of CostDelta. In step 120, k is incremented by CostDelta, and, in step 122, the value of k is checked against the variable CostDeltaLimit, which had been initialized to a value (e.g., 20) that would prevent the procedure from selecting a network plan whose cost was beyond allowable bounds. If the value of k is too large, then the procedure completes with an error in step 124. If not, then processing returns to step 114 as described earlier.

In one or more embodiments, step 108 of FIG. 1 can involve use of algorithms that use multiple-cost criteria for primary/restoration path selection (see, e.g., Doshi '03), and step 112 can involve use of a multiple-phase optimization that yields path plans that exhibit a minimum number of cross-connections required at any given node in the event of a failure (see, e.g., Alfakih '03). As described in Alfakih '03, the first phase involves finding two node-disjoint paths for each service demand within a network such that the maximum link bandwidth in the network is minimized and the link bandwidths within the network are leveled. The second phase involves further constraining a commercial solver with cost goals and identifying the primary and restoration paths for each service demand within the network such that the worst-case number of cross-connections at any node within the network is minimized across all possible single-event failures within the cost constraints.

Dual Phase Solver

Figure 2:
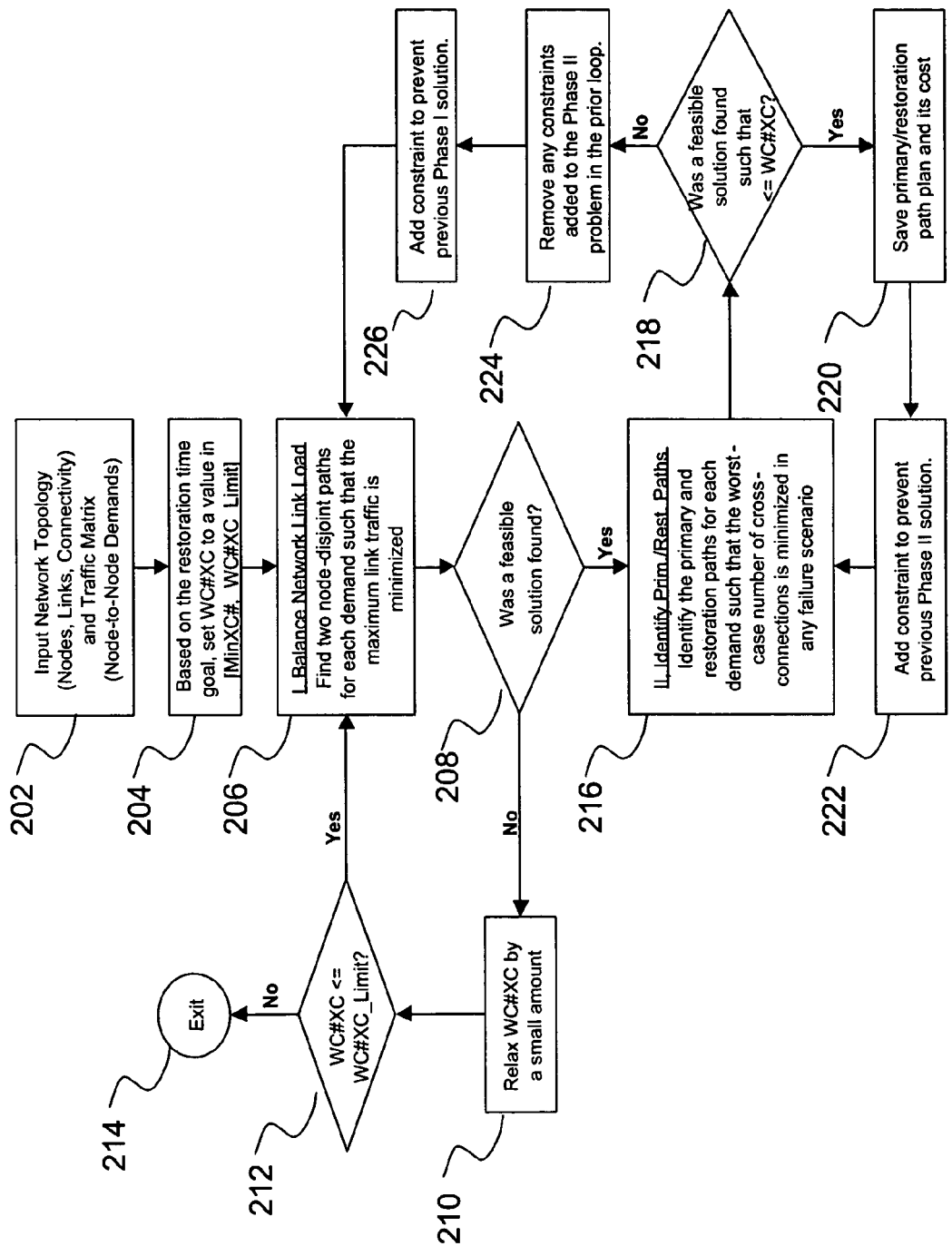
FIG. 2 illustrates another method for minimizing cost within a network while meeting restoration-time requirements via the minimization of cross-connections within the network according to another embodiment of the present invention.

A two-phase embodiment of the present invention is illustrated by the procedure of FIG. 2. In step 202, the network topology and traffic demands, respectively, for the network are input. In step 204, a parameter WC#XC (worst-cast number of cross-connects) is set to a value between (1) the quantity MinXC# (minimum cross-connect number), a graph theoretical minimum number of cross-connections given the network topology and traffic demands that were input in step 202, and (2) the quantity WC#XC_Limit, a limit on the largest value of the WC#XC parameter that would be considered acceptable based on, e.g., a service-agreement requirement on network restoration time.

In step 206 (phase I), a commercial solver is run to find two node-disjoint paths for each service demand within the network such that the maximum link bandwidth in the network is minimized and the link bandwidths within the network are substantially leveled. (Two paths are referred to as node-disjoint if they have no intermediate (i.e., transit) nodes in common.) Note that one parameter used by the solver is the current value of WC#XC. Its role in the solver is to essentially limit the solution space from which the solver can select the path pairs.

In step 208, a test is performed to see if the solver found a feasible solution in step 206 (given the current value of WC#XC). If not, then, in step 210, the value of WC#XC is increased by a small increment (i.e., the constraint is relaxed somewhat), and the new value of WC#XC is then tested in step 212 to determine if it exceeds the limit WC#XC_Limit. If it does exceed the limit, then the procedure terminates in step 214. Otherwise, the procedure returns to step 206.

For a suitably large value of WC#XC_Limit, in step 206, a feasible solution will eventually be found and the test of step 208 will then pass. In this case, step 216 (phase II) is performed. Here, a solver is used for path planning. The result of the solver is that one path of each node-disjoint path pair that was found in step 206 is assigned to be a primary path for the pair's associated demand, and the other path is assigned to be the restoration path for the demand. This path planning is performed to find a path plan from within the solution space, which path plan has the characteristic that the worst-case number of cross-connections at any node within the network is minimized across all possible single-event failures.

In step 218, a test is performed to see if the worst-case number of cross-connections of the resulting path plan is less than or equal to the current value of WX#XC. If the test of step 218 passes, then, in step 220, a cost for the path plan is calculated, and the plan and its cost are saved. Next, in step 222, a constraint is formulated and added to the primary/restoration path assignment that prevents the identical path plan from being obtained the next time step 216 is performed. The path planning is then reattempted in step 216 with the additional constraint.

Eventually, the test in step 218 will fail when no more path plans can be found in step 216 that satisfy the constraint that the worst-case number of cross-connections is less than or equal to WC#XC. In this case, as shown in step 224, all the solution-limiting constraints previously added in step 222 are eliminated. In step 226, constraints or conditions are added to the load-balancing problem of step 206 to prevent the previous path-pair solution from being generated. The modified load-balancing problem is then re-solved in step 206 at the current value of WC#XC.

This process is repeated for increasing values of WC#XC until eventually the value exceeds WC#XC_Limit at step 212, in which case the procedure terminates in step 214. At this point, assuming WC#XC_Limit was chosen sufficiently large, a number of primary/restoration path plans have been stored along with their costs. These plans all have an acceptable number of worst-case cross-connections (i.e., no worse than WC#XC_Limit). The user can search these path plans for the minimum-cost plan, or can perform a tradeoff between cost and restoration time within this limited set of plans.

Note that, alternatively or additionally, step 216 can include constraints that drive the solver toward minimum-cost path plans. These constraints can be derived from multiple-cost criteria including consideration of sharing of restoration bandwidth between disjoint path failures as discussed in Doshi '03.

Path Costs

Generally, there are a number of different metric that can be applied in calculating paths for demands within a network. Various algorithms including shortest path, minimum bandwidth, and fewest hops have been proposed in the art. As networks become more complex, these cost criteria become more complex as well. For example, the cost of path administration and reconfiguration costs of various types (measured in, for example, restoration time) can also be considered along with bandwidth costs and administrative costs. Further, multiple cost criteria, weighted relative to their importance to the path-planning algorithm, can be considered concurrently. As discussed in Doshi '03, link state information (e.g., bandwidth allocation) and sharing information can be used to compute cost-efficient connection routes within a network. For path computation, link state can be reduced to an equivalent link cost and then route-computation algorithms can be considered that minimize the total path cost—where the path cost is considered to be the sum of the link costs. Depending on the possibility of sharing bandwidth on the restoration path, link costs will be different when restoration bandwidth can be shared compared to the when it cannot. (Note that when network bandwidth can be shared, sharing information can be used to compute more cost-efficient paths through the network. This can be achieved by incorporating sharing information in the link-cost metric). The two cases are described below.

No-Sharing

Link-cost calculation can be based on the administrative weight (AW) of the link, the link capacity (LC), and link's available capacity (AC). Under light and medium link utilization (LU), where LU is less than a specified utilization threshold (UT) (i.e., $LU \leq UT$), link cost w is set equal to the AW, i.e., w=AW. Hence, under light load conditions, the link-calculation algorithm will assign links to services according to the preferences (i.e., administrative weights) assigned by the network operator. When the link load is high (LU>UT), however, the link weights are preferably calculated with the objective of load balancing and revenue maximization. The generic formula for the link cost w in this high link utilization region is based on the inverse of available capacity:

$$w = \frac{AW \cdot MWC}{AC^f} \quad (1)$$

where MWC is the maximum weight coefficient (i.e., an additional scaling factor introduced to provide continuity between the two regions of light and heavy loads) and f is an exponentiation factor (nominally set to 0.4) used to modify the available capacity variable AC. Motivation, a detailed model, and additional numerical support for this approach of weight calculation based on the inverse of available capacity are described in Dziong, Z., "ATM Network Resource Management," McGraw-Hill, 1997, (herein "Dziong '97") incorporated herein by reference in its entirety.

Sharing

When sharing information is available, it can be used to compute more cost-efficient (more optimal) primary and restoration paths. For example, an algorithm can be designed to compute for each possible primary path the lowest cost restoration path by utilizing the sharing information. Then from the set of all primary and restoration paths, the pair that requires least amount of additional capacity can be chosen. This path computation algorithm using the sharing information can give considerably better paths then an algorithm using no sharing information.

Sharing information can be used in finding the least cost restoration path for a given primary path. It requires adjustment of the link cost (lowering of it) based on the amount of sharing that is possible on a link along the restoration path of a particular primary path. This can be achieved by computing the sharing degree of each link in the network given the primary path. (Note that only links that are disjoint to the primary path need to be considered).

The sharing degree is defined as the maximum number of additional (unit bandwidth) primary services (along the proposed primary path) that can be added to the link without increasing the restoration bandwidth requirement of the link. In a sense, this metric provides a network planner with an idea of the restoration headroom on a link with respect to the proposed primary path. The higher the sharing degree, intuitively, the better the choice of the primary path for the new service, since a larger sharing degree for a primary path would allow future demands to be added along that path without the need to reserve additional restoration bandwidth.

Sharing degree can be calculated from an aggregate node-link vector $V_{nla}$ representation of sharing information and a primary path node-link vector $V_{pnl}$ representation according to the following relationship:

$$SD = \text{the maximum value } m \text{ for which } \max\{m \cdot V_{pnl} + V_{nla}\} = RB,$$

where RB is the current reservation bandwidth on the link under consideration.

A less accurate measure of sharing degree can be calculated using a compact representations of the aggregate node-link vector. Note that, here, less accurate means that the sharing degree only provides a conservative indication of which links may be better, but it does not provide the exact bandwidth available for sharing for a particular primary path.

Sharing degree can be calculated from the node-aggregate vector $V_{na}$ representation of sharing information and the primary path node vector $V_{pn}$ representation according to the following relationship:

$$SD = \text{the maximum value } m \text{ for which } \max\{m \cdot V_{pn} + V_{na}\} = RB.$$

Sharing degree can also be calculated using the binary representation of node-link or node vector. In case availability of sharing information in terms of the binary node-link vector $V_{nlb}$ for a link, the sharing degree can be computed by first deriving a binary primary path node-link vector $V_{pnlb}$ from the primary path node-link vector $V_{pnl}$ (in the similar fashion as $V_{nlb}$ can be derived from $V_{nla}$), then taking an OR of the $V_{pnlb}$ (binary primary path node-link vector) and $V_{nlb}$ (binary node link vector representation of the sharing information on the link), and then taking the bit AND of the resulting vector. This will result in a sharing degree of one if the sharing is possible and zero otherwise. Note that the sharing degree obtained in this manner using the binary node-link vector does not give the exact amount of sharing that is possible on the link for the primary path. It only indicates that if the sharing is possible or not.

Similarly, a more crude sharing degree can be derived by using the binary node vector information.

In one implementation, the link cost is calculated according to the following equation, which considers the sharing degree (SD) calculated as discussed earlier:

$$w = \frac{AW}{(1+SD)}.$$

When bandwidth sharing is possible for a link, it would appear that there is no immediate bandwidth-related cost for new restoration path reservation using that link. However, when applying the Markov decision theory framework described in Dziong '97, there is a cost. This follows from the fact that the cost should be considered during the whole connection-holding time, not just at the instant of a new connection arrival. The Markov process makes it possible to consider the probabilistic cost of using the link, since, even if sharing is possible at the moment of connection arrival, in the future, with some probability, the other shared connections can be terminated and the new connection will be the sole occupant of the reserved bandwidth on that link, and hence incur a cost for reserving additional restoration bandwidth in the network. While exact calculation of such a cost seems to be very difficult, if possible, one can use this argument to employ a non-zero link cost even when sharing is possible. In one implementation, this fact can be accommodated by calculating link cost according to the following equation:

$$w = \frac{AW}{(1+b \cdot SD)} \quad (2)$$

where b is a specified coefficient.

While the embodiments of this invention have been discussed with respect to implementations that pre-compute pathways, they may equally well be applied to implementations where some or all of the computation or optimization of alternative routes is computed after the failure is detected and in some cases may involve fault isolation in the alternative route determination.

While this invention has been described with respect to specific costs typically minimized in path planning algorithms inclusive of costs that are a function of sharability of network resources, other costs and multiple cost criteria can be considered, as would be understood to one skilled in the art.

While this invention has been described with respect to restoration associated with situations involving single-point failures, the concepts, and in particular, the link-state description, can be extended to multiple-point failure situations, as would be understood to one skilled in the art.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A path-manager-implemented method, comprising:
    the path manager receiving one or more demands for service in a mesh network, which network comprises a plurality of nodes interconnected by a plurality of links; and
    the path manager mapping each of the one or more demands onto a primary path and a restoration path in the network to generate at least one path plan for the one or more demands in the network, wherein the at least one path plan is generated as a function of (i) one or more cost criteria associated with the at least one path plan and (ii) a failure-related cross-connection criterion associated with the path plan by:
    (a) calculating a set of node-disjoint path pairs for the one or more demands based on the failure-related cross-connection criterion, wherein a node-disjoint path pair is calculated for each demand;
    (b) identifying primary and restoration paths for each node-disjoint path pair in the set to generate a path plan for the one or more demands;
    (c) determining whether the path plan satisfies the failure-related cross-connection criterion;
    (d) saving, when the path plan satisfies the failure-related cross-connection criterion, the path plan;
    (e) repeating steps (a)-(d) to generate two or more path plans that satisfy the failure-related cross-connection criterion; and
    (f) selecting one of the path plans based on the one or more cost criteria.

2. The invention of claim 1, wherein the one or more cost criteria are a function of at least one of sharing degree, administrative weight, link utilization, and available capacity.

3. The invention of claim 1, wherein, when the path plan satisfies the failure-related cross-connection criterion, steps (b)-(d) are repeated with a constraint that excludes each and every saved path plan.

4. The invention of claim 3, wherein steps (b)-(d) are repeated only until the path plan fails the failure-related cross-connection criterion.

5. The invention of claim 1, wherein, when the path plan fails the failure-related cross-connection criterion, steps (a)-(d) are repeated with a constraint that excludes each set of node-disjoint paths.

6. The invention of claim 5, wherein, when calculating a set of node-disjoint path pairs for the one or more demands per step (a) fails to find a feasible solution, the failure-related cross-connection criterion is relaxed and steps (a)-(e) are repeated using the relaxed failure-related cross-connection criterion.

7. A path manager for a mesh communications network, the manager comprising one or more computing elements, wherein the manager is adapted to:
    receive one or more demands for service in the mesh network, which network comprises a plurality of nodes interconnected by a plurality of links; and
    map each of the one or more demands onto a primary path and a restoration path in the network to generate at least one path plan for the one or more demands in the network, wherein the at least one path plan is generated as a function of (i) one or more cost criteria associated with the at least one path plan and (ii) a failure-related cross-connection criterion associated with the path plan by:

(a) calculating a set of node-disjoint path pairs for the one or more demands based on the failure-related cross-connection criterion, wherein a node-disjoint path pair is calculated for each demand;

(b) identifying primary and restoration paths for each node-disjoint path pair in the set to generate a path plan for the one or more demands;

(c) determining whether the path plan satisfies the failure-related cross-connection criterion;

(d) saving, when the path plan satisfies the failure-related cross-connection criterion, the path plan;

(e) repeating steps (a)-(d) to generate two or more path plans that satisfy the failure-related cross-connection criterion; and (f) selecting one of the path plans based on the one or more cost criteria.

8. The invention of claim 7, wherein the one or more cost criteria are a function of at least one of sharing degree, administrative weight, link utilization, and available capacity.

9. The invention of claim 7, wherein, when the path plan satisfies the failure-related cross-connection criterion, steps (b)-(d) are repeated with a constraint that excludes each and every saved path plan.

10. The invention of claim 9, wherein steps (b)-(d) are repeated only until the path plan fails the failure-related cross-connection criterion.

11. The invention of claim 7, wherein, when the path plan fails the failure-related cross-connection criterion, steps (a)-(d) are repeated with a constraint that excludes each set of node-disjoint paths.

12. The invention of claim 11, wherein, when calculating a set of node-disjoint path pairs for the one or more demands per step (a) fails to find a feasible solution, the failure-related cross-connection criterion is relaxed and steps (a)-(e) are repeated using the relaxed failure-related cross-connection criterion.

13. The invention of claim 7, wherein the failure-related cross-connection criterion specifies a maximum number of cross-connections that are changed in any node in the network following a failure in the network, wherein a path plan does not satisfy the failure-related cross-connection criterion if the number of failure-related cross-connections that are changed in any node in the path plan following a failure in the network exceeds the specified maximum number.

14. The invention of claim 1, wherein the failure-related cross-connection criterion specifies a maximum number of cross-connections that are changed in any node in the network following a failure in the network, wherein a path plan does not satisfy the failure-related cross-connection criterion if the number of failure-related cross-connections that are changed in any node in the path plan following a failure in the network exceeds the specified maximum number.

15. A path-manager-implemented method, comprising:
the path manager receiving one or more demands for service in a mesh network, which network comprises a plurality of nodes interconnected by a plurality of links; and the path manager mapping each of the one or more demands onto a primary path and a restoration path in the network to generate at least one path plan for the one or more demands in the network, wherein the at least one path plan is generated as a function of (a) one or more cost criteria associated with the at least one path plan and (b) a failure-related cross-connection criterion associated with the path plan by:

calculating a first set of one or more path plans that satisfy the one or more cost criteria;

calculating a second set of one or more path plans that satisfy the failure-related cross-connection criterion;

determining whether the first and second sets have any path plans in common; and if not, then, until the first and second sets have at least one path plan in common, relaxing the one or more cost criteria and recalculating the first set.

16. The invention of claim 15, wherein the failure-related cross-connection criterion specifies a maximum number of cross-connections that are changed in any node in the network following a failure in the network, wherein a path plan does not satisfy the failure-related cross-connection criterion if the number of failure-related cross-connections that are changed in any node in the path plan following a failure in the network exceeds the specified maximum number.

17. The invention of claim 15, wherein the one or more cost criteria are a function of at least one of sharing degree, administrative weight, link utilization, and available capacity.

18. A path manager for a mesh communications network, the manager comprising one or more computing elements, wherein the manager is adapted to:

receive one or more demands for service in the mesh network, which network comprises a plurality of nodes interconnected by a plurality of links; and map each of the one or more demands onto a primary path and a restoration path in the network to generate at least one path plan for the one or more demands in the network, wherein the at least one path plan is generated as a function of (a) one or more cost criteria associated with the at least one path plan and (b) a failure-related cross-connection criterion associated with the path plan by:

calculating a first set of one or more path plans that satisfy the one or more cost criteria;

calculating a second set of one or more path plans that satisfy the failure-related cross-connection criterion;

determining whether the first and second sets have any path plans in common; and if not, then, until the first and second sets have at least one path plan in common, relaxing the one or more cost criteria and recalculating the first set.

19. The invention of claim 18, wherein the failure-related cross-connection criterion specifies a maximum number of cross-connections that are changed in any node in the network following a failure in the network, wherein a path plan does not satisfy the failure-related cross-connection criterion if the number of failure-related cross-connections that are changed in any node in the path plan following a failure in the network exceeds the specified maximum number.

20. The invention of claim 18, wherein the one or more cost criteria are a function of at least one of sharing degree, administrative weight, link utilization, and available capacity.

* * * * *

UNITED STATES PATENT AND TRADEMARK OFFICE
CERTIFICATE OF CORRECTION

PATENT NO.        : 7,643,408 B2                                    Page 1 of 1
APPLICATION NO. : 10/815123
DATED             : January 5, 2010
INVENTOR(S)       : Atkinson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Twenty-first Day of December, 2010

David J. Kappos
*Director of the United States Patent and Trademark Office*